United States Patent
Bassery et al.

(10) Patent No.: US 10,704,419 B2
(45) Date of Patent: Jul. 7, 2020

(54) TURBINE DISTRIBUTOR SECTOR FOR AN AIRCRAFT TURBINE ENGINE

(71) Applicant: SAFRAN AIRCRAFT ENGINES, Paris (FR)

(72) Inventors: Josserand Jacques Andre Bassery, Courbevoie (FR); Jean-Charles Marcel Bernard Coetard, Villiers en Plaine (FR); Raphael Jean Philippe Dupeyre, Asnieres sur Seine (FR); Etienne Leon Francois, Ermont (FR); Ba-Phuc Tang, Puiseux Pontoise (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 226 days.

(21) Appl. No.: 16/211,134

(22) Filed: Dec. 5, 2018

(65) Prior Publication Data

US 2020/0025037 A1 Jan. 23, 2020

(30) Foreign Application Priority Data

Dec. 6, 2017 (FR) ...................................... 17 61698

(51) Int. Cl.
*F01D 5/18* (2006.01)
*F01D 9/04* (2006.01)
(Continued)

(52) U.S. Cl.
CPC .......... *F01D 25/246* (2013.01); *F01D 5/189* (2013.01); *F01D 9/041* (2013.01); *F01D 9/065* (2013.01);
(Continued)

(58) Field of Classification Search
CPC .......... F01D 5/189; F01D 9/041; F01D 9/065; F01D 25/246; F05D 2240/125; F05D 2240/81; F05D 2250/14
See application file for complete search history.

(56) References Cited

U.S. PATENT DOCUMENTS 3,628,880 A * 12/1971 Smuland ................. F01D 5/189
415/175
5,545,002 A * 8/1996 Bourguignon .......... F01D 5/187
415/115

(Continued)

FOREIGN PATENT DOCUMENTS

EP 2990607 A1 3/2016
FR 2862338 A1 5/2005
(Continued)

OTHER PUBLICATIONS

Preliminary Research Report and Written Opinion received for French Application No. 1761698, dated Aug. 23, 2018, 8 pages (1 page of French Translation Cover Sheet and 7 pages of original document).

*Primary Examiner* — Igor Kershteyn
(74) *Attorney, Agent, or Firm* — Womble Bond Dickinson (US) LLP

(57) ABSTRACT

Turbine distributor sector for an aircraft turbine engine, including an external annular platform sector and an internal annular platform sector, the sectors being coaxial and being connected together by blade assemblies including inner cavities cooled by gas circulation, the external platform sector including through openings of which radially internal ends open into the inner cavities, wherein the external platform sector includes inner ducts for supplying the cavities with gas, the ducts including air outlets opening into the (Continued)

openings and air inlets opening onto a portion of the external annular surface of the external platform sector.

10 Claims, 3 Drawing Sheets

(51) Int. Cl.
*F01D 9/06* (2006.01)
*F01D 25/24* (2006.01)

(52) U.S. Cl.
CPC .... *F05D 2240/125* (2013.01); *F05D 2240/81* (2013.01); *F05D 2250/14* (2013.01)

(56) References Cited

U.S. PATENT DOCUMENTS

| | | | |
|---|---|---|---|
| 5,630,700 A * | 5/1997 | Olsen | F01D 5/189 |
| | | | 415/134 |
| 5,711,650 A | 1/1998 | Tibbott et al. | |
| 6,065,282 A | 5/2000 | Fukue et al. | |
| 6,454,526 B1 * | 9/2002 | Cunha | F01D 5/147 |
| | | | 415/115 |
| 6,561,757 B2 * | 5/2003 | Burdgick | F01D 5/186 |
| | | | 415/114 |
| 7,946,801 B2 * | 5/2011 | Shapiro | F01D 5/08 |
| | | | 415/1 |
| 2003/0035717 A1 | 2/2003 | Tiemann | |
| 2005/0167531 A1 * | 8/2005 | Soupizon | F01D 9/06 |
| | | | 239/533.1 |
| 2007/0231123 A1 * | 10/2007 | Dervaux | F01D 9/06 |
| | | | 415/115 |
| 2007/0231150 A1 | 10/2007 | Dervaux et al. | |
| 2009/0041586 A1 | 2/2009 | Bacha et al. | |
| 2017/0016338 A1 * | 1/2017 | Porter | F01D 9/041 |

FOREIGN PATENT DOCUMENTS

| | | |
|---|---|---|
| FR | 2899271 A1 | 10/2007 |
| FR | 2899281 A1 | 10/2007 |
| FR | 2919897 A1 | 2/2009 |
| GB | 2107405 A | 4/1983 |
| GB | 2298244 A | 8/1996 |
| GB | 2546841 A | 8/2017 |

\* cited by examiner

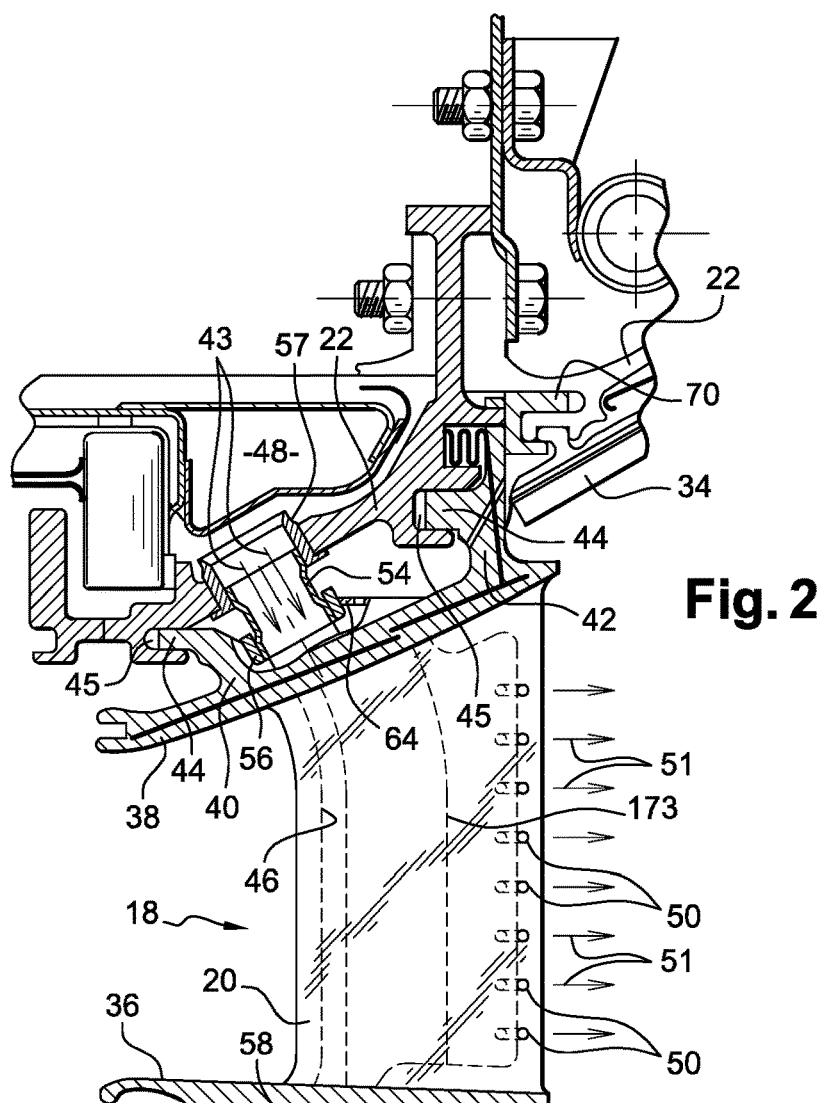
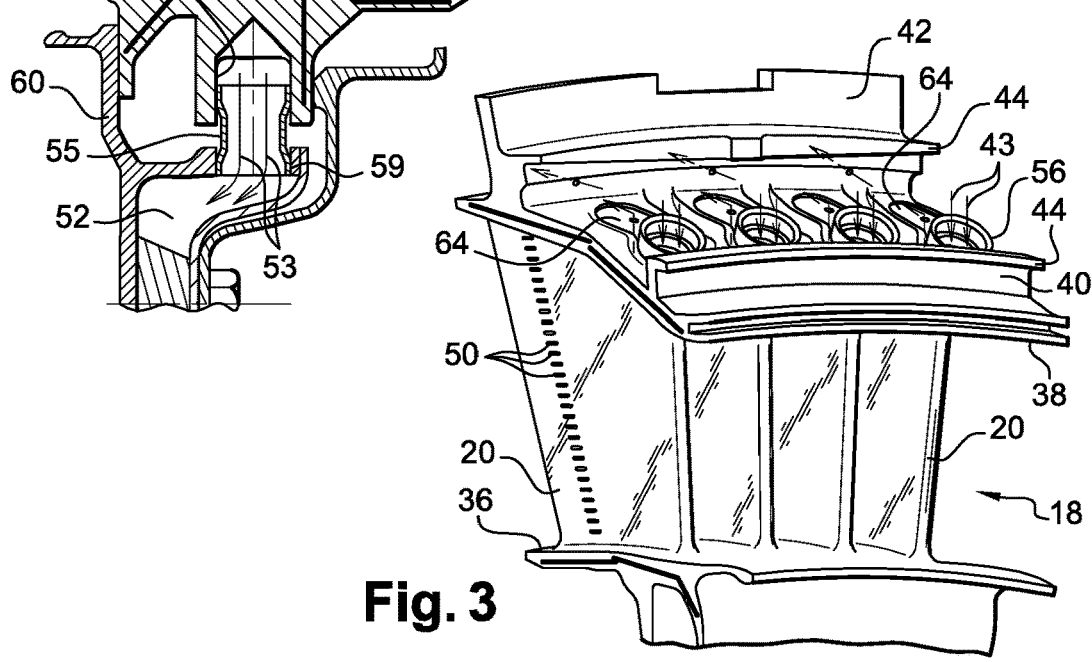

TURBINE DISTRIBUTOR SECTOR FOR AN AIRCRAFT TURBINE ENGINE

TECHNICAL FIELD

This invention in particular relates to a turbine distributor sector for an aircraft turbine engine.

STATE OF THE ART

The state of the art comprises in particular documents FR-A1-2 862 338, FR-A1-2 899 271, FR-A1-2 899 281 and FR-A1-2 919 897.

A turbine of a turbine engine comprises several stages each comprising a distributor formed from an annular row of fixed blade assemblies carried by the casing of the turbine and a rotationally mounted wheel downstream from the distributor in an annular jacket formed by ring sectors arranged circumferentially and fastened onto casing hooks of the turbine by C-shaped locks.

The blade assemblies of the distributor of the first stage or upstream stage, in particular of the high pressure or HP body of the turbine engine, are exposed to high temperatures and comprise inner cavities for the flow of cooling air taken upstream on the compressor of the turbine engine and conveyed by ducts to an enclosure formed in the casing around the distributor upstream from the turbine.

According to current techniques, cylindrical connecting bushings are mounted in the enclosure and each connects the enclosure to an inner cavity of a blade assembly of the distributor. The cooling air exits from this cavity at the radially internal end of the blade assembly of which the trailing edge can also comprise orifices opening into the cavity for the exiting of the cooling air.

A turbine distributor comprises an external annular platform sector and an internal annular platform sector between which the blade assemblies extend. The external platform sector comprises through openings of which the radially internal ends open into the inner cavities. Their radially external ends receive rings for centring the aforementioned connecting bushings and furthermore receive added plates for the sealed closing of the openings.

In this application, the terms "external" and "internal" describe the position of a part in the radial direction in relation to an axis, in particular of the turbine engine. An external part will therefore extend radially outwards and therefore around an internal part.

In this application, furthermore, the terms "upstream" and "downstream" are expressions that refer to the flow of gases in the turbine engine.

The current technology described hereinabove is cumbersome due in particular to the connecting bushings and C-shaped locks which can also be used to fasten the external platform sectors of the distributors to turbine casing hooks. Moreover, these added parts have a relatively substantial mass.

This invention proposes an improvement to this technology in order to improve the encumbrance and reduce the overall mass of a distributor and of a turbine of a turbine engine.

DISCLOSURE OF THE INVENTION

The invention proposes a turbine distributor sector for an aircraft turbine engine, comprising an external annular platform sector and an internal annular platform sector, said sectors being coaxial and being connected together by blade assemblies comprising inner cavities cooled by gas circulation, the external platform sector comprising through openings of which radially internal ends open into said inner cavities, characterised in that said external platform sector comprises inner ducts for supplying said cavities with gas, said ducts comprising air outlets opening into said openings and air inlets opening onto a portion of the external annular surface of the external platform sector.

The invention thus proposes to remove the connecting bushings of the prior art. The added plates can be designed to close the entirety of the radially external ends of the openings which then are no longer intended to receive rings for guiding the connecting bushings. Supplying the openings and the inner cavities of the blade assemblies with air is carried out by ducts integrated into the external platform sectors. The removal of the bushings and replacement thereof with integrated ducts makes it possible to significantly reduce the radial dimension of the means for supplying cavities of the blade assemblies with air and therefore the radial encumbrance of the distributor and of the turbine comprising this distributor.

The distributor sector according to the invention can include one or several of the following characteristics, taken individually from one another or in combination with one another:

said openings having radially external ends are closed by added plates, each one of said openings extends at least partially into a boss protruding over a portion of the external annular surface of the external platform sector, each one of said ducts extending at least partially into this boss, the air inlets are located on a portion of the external cylindrical surface of an annular rim, in particular downstream, for attaching of the distributor to a turbine casing, the annular rim has in its axial section locally a general L shape and comprises a substantially radial wall sector and a cylindrical wall sector which extends in the upstream direction or on the side of the openings from the radial wall sector, the cylindrical wall sector is connected to each one of said bosses by excess thicknesses of material wherein said ducts extend at least partially, the openings each have a general shape with a blade profile, each one of said air outlets opens into said opening, between a radially external end of this opening and an internal peripheral shoulder of the opening which is configured to support a ventilation jacket engaged in said inner cavity, said air outlets each have a general elongated shape in a plane that is substantially parallel to the external platform sector, the external platform sector comprises an upstream end with an axial section with the general shape of a C, which defines an annular space oriented axially on the side opposite said openings, this end comprising an external annular rim and an internal annular rim which is serrated and comprises a series of axial teeth; this makes it possible to remove the C-shaped lock of the prior art and to replace it with fastening means integrated into the external platform sector; removing fastening locks of the distributors of a turbine makes it possible to significantly reduce the axial encumbrance of the distributor and of a turbine comprising this distributor.

This invention also relates to a turbine of an aircraft turbine engine, comprising a turbine casing extending around an axis of the turbine and carrying an annular row of distributors such as described hereinabove, characterised in that said portions of the external annular surface of the distributors are bearing against an annular wall of the casing, this annular wall of the casing comprising an annular row of orifices for supplying with air which are aligned with the air inlets present on the portions of the external annular surface of the distributors.

Advantageously, the casing comprises an annular lug that extends and is surrounded by the annular row of orifices and comprising axial teeth engaged circumferentially between said excess thicknesses.

This invention further relates to a turbine engine, characterised in that it comprises a turbine such as described hereinabove.

DESCRIPTION OF THE FIGURES

The invention shall be better understood and other details, characteristics and advantages of the invention shall appear more clearly when reading the following description given by way of a non-limiting example and with reference to the accompanying drawings wherein:

FIG. 2 is a view on a larger scale of a portion of FIG. 1, and shows a distributor of the upstream stage of the turbine, FIG. 3 is a partial schematic perspective view of a distributor sector of the upstream stage of the turbine, seen from upstream and from the side;

DETAILED DESCRIPTION

Figure 1:
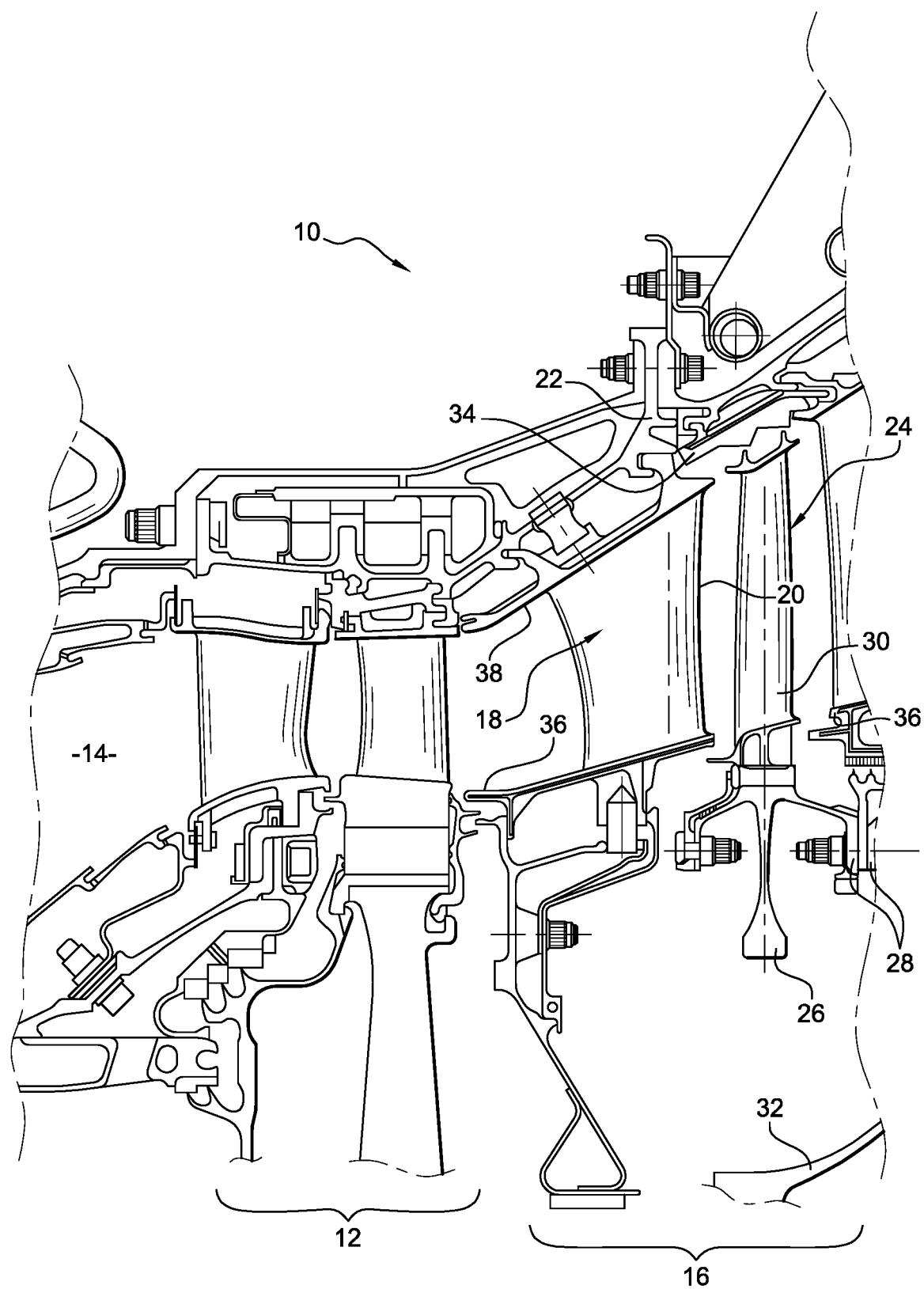
FIG. 1 is a partial schematic and axial cross-section view of an aircraft turbine engine.

In FIG. 1, the reference 10 designates a turbine engine turbine formed from a high-pressure module 12 arranged at the outlet of a combustion chamber 14 and of a low-pressure module 16 located downstream from the high-pressure module 12 and comprising four stages each comprising a distributor 18 formed from an annular row of fixed blade assemblies 20 carried by an external casing 22 of the turbine, and a wheel 24 downstream of the distributor 18.

The wheels 24 include discs 26 assembled axially to one another by annular flanges 28 and carrying radial blades 30. The wheels 24 are connected to a turbine shaft (not shown) by means of a driving cone 32 fastened onto annular flanges 28 of the discs 26.

Each wheel 24 is externally surrounded with a small clearance by a cylindrical jacket formed by ring sectors 34 fastened circumferentially onto the casing 22 of the turbine by the intermediary of C-shaped locking parts.

The distributor sectors 18, also called "distributors" herein, each comprise an internal platform sector 36 and an external platform sector 38, which delimit between them the annular duct for the flow of gases in the turbine and between which the blade assemblies 20 extend radially, of which there are two.

The external platform sector 38 of the distributor 18 of the upstream stage which can be seen better in FIG. 2 comprises upstream 40 and downstream 42 radially external annular rims comprising axial annular lugs 44 oriented in the upstream direction and intended to be engaged in corresponding axial annular grooves 45 of the casing 22 of the turbine.

The blade assemblies 20 of this distributor 18 comprise inner cavities 46 for the circulation of cooling air coming from a supply enclosure 48 (as shown by the arrows 43), radially external to the external platform sector 38 of the distributor, this air being partially removed in the duct for the flow of gases of the turbine by orifices 50 formed in the vicinity of the trailing edge of the blade assemblies 20 and opening into the inner cavities 46 thereof (arrows 51) and partially removed in an enclosure 52 radially internal to the internal platform sector 36 of the distributor (arrows 53). The cooling air is taken upstream on a compressor of the turbine engine and conveyed into the supply enclosure by ducts that are not shown.

The cavities 46 of the blade assemblies are connected to the external 48 and internal 52 enclosures by cylindrical bushings 54, 55, respectively. Each bushing 54 for the passage of air between the external enclosure 48 and a cavity 46 of a blade assembly has one end sealingly engaged in a ring 56 fastened in an opening formed in the external platform sector 38 of the distributor between the external annular rims 40, 42 and opening into the inner cavity 46 of a blade assembly. The other of its ends is sealingly engaged in a ring 57 fastened in an orifice formed in the casing 22 of the turbine. The bushings 55 for the passage of air between the cavities 46 of the blade assemblies and the internal enclosure 52 have their ends sealingly engaged in orifices 58, 59 of the internal platform sector 36 of the distributor and of an annular rim of the casing 60 of the enclosure 52, respectively.

The cavity 46 of each blade assembly 20 communicates with the opening formed in the external platform sector 38 of the distributor that receives the ring 56. A plate 64 is added and fastened in the opening of the external platform sector 38, as can be seen in FIG. 3, in order to hermetically close the cavity 46 of the blade assembly.

Although it is not the case in the technology shown in the drawings, the lugs 44 of the external platform sector 38 can be radially maintained tight against similar lugs of the casing 22 by means of circumferential locks with a C-shaped section of which one (reference 70) can be seen in FIG. 2 but is used for the fastening of a ring sector 34 located directly downstream from the distributor 18 of the upstream stage.

Such a lock 70 comprises two respectively internal and external annular walls, extending one around the other and connected at one of the axial ends thereof by a substantially radial annular core. A lock 70 defines an axially oriented space and intended to receive the aforementioned lugs of the external platform sector 38 and of the casing 22 so as to maintain them radially tight against one another.

The invention makes it possible to reduce the number of added parts of a turbine distributor sector in order to optimise its encumbrance and mass. The casing whereon are mounted the distributor sectors can have a reduced diameter due to the low encumbrance of the sectors.

FIGS. 4 to 7 show an embodiment of the invention. In this example, only the external platform sector 138 of the distributor 118 according to the invention is shown. This distributor 118 however comprises the aforementioned general characteristics described in relation with the distributor 18, and in particular an internal platform sector 36 connected to the external platform sector 138 by blade assemblies 20 comprising inner cavities 46 cooled by gas circulation.

The external platform sector 138 comprises through openings 172 of which radially internal ends open into the inner cavities 46 and of which radially external ends are closed by added plates 174. These plates 174 are similar to those 64 of FIG. 3 except for the fact that they here close all of the openings 172 due to the absence of rings 56 and of bushings in the distributor according to the invention.

In the example shown, the openings 172 each have a general shape with a blade profile. They have in particular a shape similar to that of the tubular ventilation jackets 173 which are engaged in the cavities 46, from the openings 172. FIG. 2 schematically shows a jacket of this type. The plates 174 are flat and more preferably have a general shape similar to that of the openings 172 and therefore have an external contour with a blade profile.

Each opening 172 extends at least partially into a boss 176 protruding over a portion of the external annular surface 178 of the external platform sector 138. Each boss 176 has at least partially a general shape with a blade profile and can be considered as a radial extension of the corresponding blade assembly of the radially exterior distributor of the platform sector 138.

Each opening 172 comprises an internal peripheral shoulder 180 for retaining the tubular ventilation jacket 173. This jacket is engaged in the inner cavity 46 of each blade assembly 20, from the opening 172, and comprises at the radially external end thereof a peripheral rim intended to bear against this shoulder 180.

Figure 7:
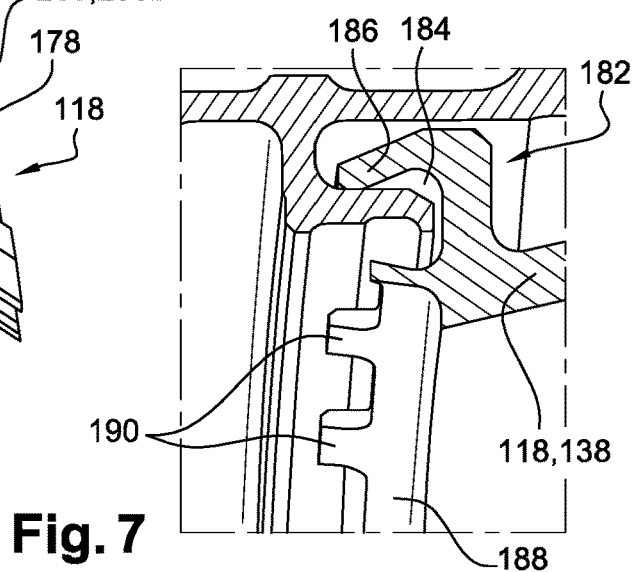
FIG. 7 is a partial schematic perspective view on a larger scale of an upstream end of an external platform sector of a distributor sector according to the invention.

The external platform sector 138 comprises an upstream end 182 with a section with a general C-shape which defines an annular space 184 oriented axially on the side opposite the openings 172. This end 182 comprises an external annular rim 186 and an internal annular rim 188 which is serrated and comprises a series of axial teeth 190 (FIG. 7).

Figure 4:
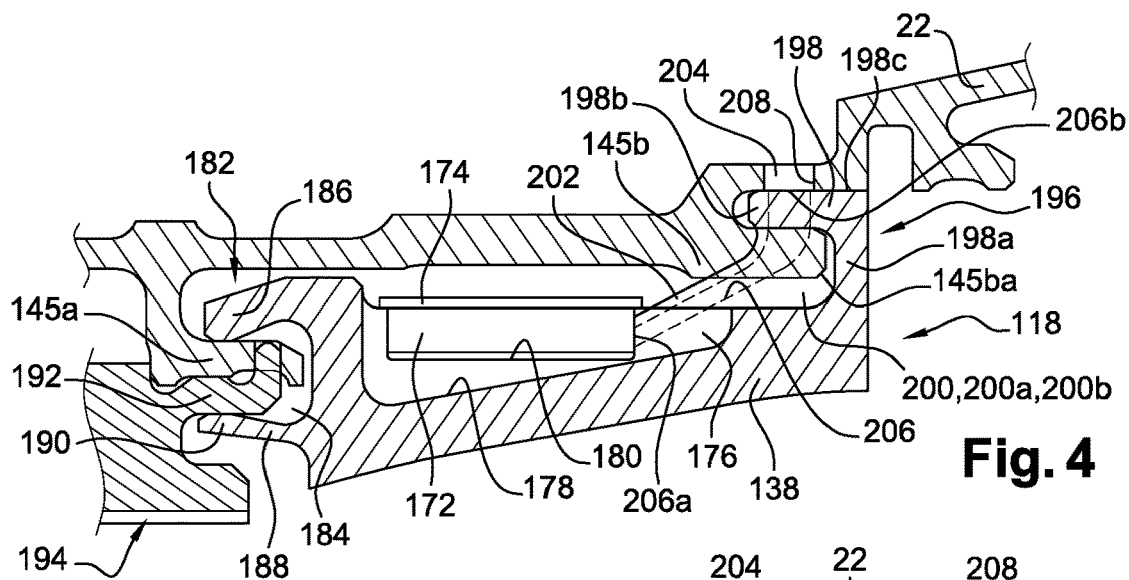
FIG. 4 is a schematic half-view as an axial cross-section of a casing and of an external platform sector of a distributor sector according to the invention.

As can be seen in FIG. 4, a downstream annular lug 192 of an upstream ring 194 is radially applied against the annular lug 145a of the casing 22, and these lugs 192, 145a are axially engaged in the space 184 of the upstream end 182 in such a way that the rims 186, 188 are respectively engaged outside and inside these lugs. The external rim 186 radially bears against the lug 192 and the teeth 190 radially bear against the lug 45. The rim 186 and the teeth 190 have a degree of flexibility in the radial direction and are intended to radially be stressed in the mounting position in such a way as to radially maintain tight the lugs 192, 45. The number of teeth 190 per distributor is for example 4. This configuration makes it possible to do without the C-shaped lock of prior art, mentioned hereinabove.

The external platform sector 138 comprises at the downstream end 196 thereof an annular rim 198 that has a section in the general shape of an L. This rim 198 comprises a substantially radial wall sector 198a and a cylindrical wall sector 198b that extends on the side of the openings 172 from the external periphery of the radial wall sector 198a. The sector 198b extends around the surface 178 and defines with the latter an annular space 200.

Figure 6:
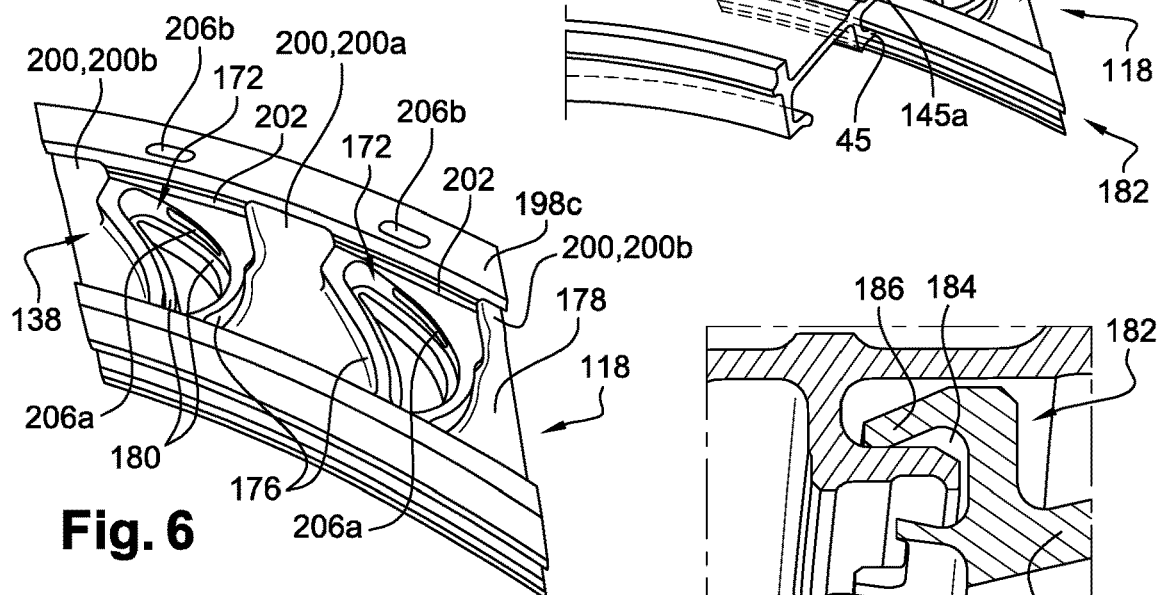
FIG. 6 is a schematic perspective view of an external platform sector of an distributor sector according to the invention.

As can be seen in FIG. 6, the rim 198 is connected to the boss 176 by material excess thicknesses 202 that interrupt the space 200 by forming pockets 200a, 200b. In the example shown wherein the distributor 118 comprises two blade assemblies and two openings 172 at its external platform sector 138, a pocket 200a is defined between the two machining allowances 202 for the connection of the bosses 176 to the rim 198, and two portions of pockets 200b are defined between these bosses and side edges of the external platform sector 138.

The downstream lug 145b of the casing 22, which cooperates with the rim 198, here comprises axial teeth 145ba which are engaged in the space 200 and more exactly in the pockets 200a, 200b. This cooperation has the advantage of rotationally immobilising the distributor 118 with respect to the casing 22, the teeth 145a being able to bear laterally via their circumferential ends against the excess thicknesses 202. It is thus possible to suppress the anti-rotation means of the distributor of prior art, which are in general carried out by machining of the distributor. The lug 145b extends radially inside a cylindrical portion 204 of the casing, and substantially parallel to the latter.

According to a characteristic of the invention, the external platform sector 138 comprises inner ducts 206 for supplying cavities 46 with gas. These ducts 206 comprise air outlets 206a opening into the openings 172 and air inlets 206b opening onto a portion of the annular surface of the external platform sector 138. In the example shown, the air inlets 206b are located on the portion of external cylindrical surface 198c of the rim 198, which is surrounded by the casing portion 204.

Each opening 172 is here supplied by a single duct 206. The duct 206 extends at least partially into the thickness 202 and the boss 176 to which is connected the corresponding opening 172. Each duct 206 comprises a first substantially radial and downstream portion, of which the radially external end is connected to the inlet 206b and of which the radially internal end is connected to the downstream end of a second substantially axial portion. The upstream end of this second portion is connected to the outlet 206a (FIG. 4).

The air inlets 206b have a general elongated shape in the circumferential direction. The air outlets 206a each have a general elongated shape in a plane that is substantially parallel to the external platform sector 138. The latter are here located radially outside the surface 180, between the latter and the added plate 174.

Figure 5:
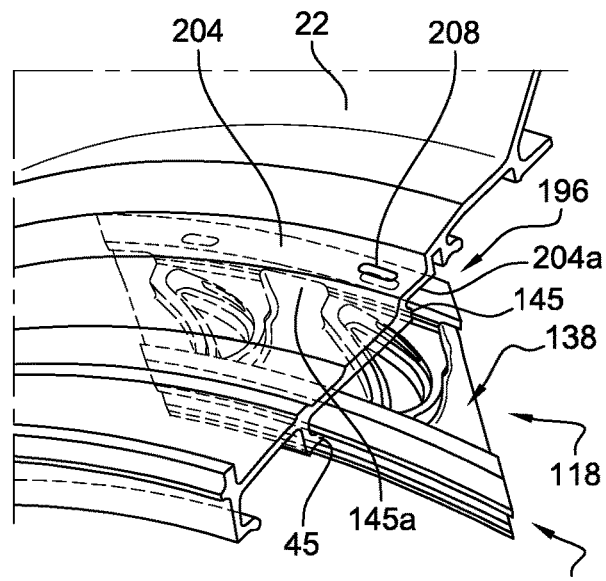
FIG. 5 is a partial schematic perspective view of a casing and of an external platform sector of a distributor sector according to the invention.

As can be seen in FIG. 4, the air penetrates into the ducts 206 by orifices 208 formed in the casing 22 and more precisely into the portion 204. The orifices 208 are aligned with the air inlets 206b and have a shape similar to that of these air inlets (FIG. 5). Advantageously, the rim 198 is radially thrust against the inner cylindrical surface 204a of the portion 204 comprising the orifices 208, in such a way as to prevent air leaks in this zone (FIGS. 4 and 5).

The air that passes through the orifices 208, circulates in the ducts 206 to the openings 172 then penetrates into the cavities 46 of the blade assemblies 20. It then flows as in the prior art.

The distributor 118 according to the invention can be made by casting. Conventionally, the cavities 46 can be obtained by means of one or several cores provided in the mould for creating the distributor. Advantageously, this or these cores are provided to also define the ducts 206 for supplying cavities with air.

This new technology makes it possible to avoid the added C-shaped locks as well as the connecting bushings of the prior art. This makes it possible to reduce the number of parts to be mounted and ultimately the time and the cost of mounting the distributor. In addition, the line of the casing can be lowered, which allows for a reduced mass and a compacting of the turbine.

The invention claimed is:

1. A turbine distributor sector for an aircraft turbine engine, comprising an external annular platform sector and an internal annular platform sector, said sectors being coaxial and being connected together by blade assemblies comprising inner cavities cooled by gas circulation, the external platform sector comprising through openings of which radially internal ends open into said inner cavities, wherein said external platform sector comprises inner ducts for supplying said cavities with gas, said ducts comprising air outlets opening into said openings and air inlets opening onto a portion of the external annular surface of the external platform sector.

2. The turbine distributor sector according to claim 1, wherein each one of said openings extends at least partially into a boss protruding over a portion of the external annular surface of the external platform sector, each one of said ducts extending at least partially into this boss.

3. The turbine distributor sector according to claim 1, wherein the air inlets are located on a portion of the external cylindrical surface of an annular rim, for attaching of the distributor to a turbine casing.

4. The turbine distributor sector according to claim 3, wherein the annular rim has in its axial section locally a general L shape and comprises a substantially radial wall sector and a cylindrical wall sector that extends on the side of the openings from the radial wall sector.

5. The turbine distributor sector according to claim 4, wherein each one of said openings extends at least partially into a boss protruding over a portion of the external annular surface of the external platform sector, each one of said ducts extending at least partially into this boss, and wherein the cylindrical wall sector is connected to each one of said bosses by material excess thicknesses into which said ducts extend at least partially.

6. The turbine distributor sector according to claim 1, wherein each one of said air outlets opens into said opening, between a radially external end of this opening and an internal peripheral shoulder of the opening which is configured to support a ventilation jacket engaged in said inner cavity.

7. The turbine distributor sector according to claim 1, wherein said air outlets each have a general elongated shape in a plane that is substantially parallel to the external platform sector.

8. The turbine distributor sector according to claim 1, wherein the external platform sector comprises an upstream end with an axial section in the general shape of a C which defines an annular space oriented axially on the side opposite said openings, this end comprising an external annular rim and an internal annular rim which is serrated and comprises a series of axial teeth.

9. A turbine of an aircraft turbine engine, comprising a turbine casing extending around an axis of the turbine and carrying an annular row of distributor sectors according to claim 1, wherein said portions of the external annular surface of the distributors bear against an annular wall of the casing, this annular wall of the casing comprising an annular row of orifices for supplying with air which are aligned with the air inlets present on the portions of the external annular surface of the distributors.

10. The turbine according to claim 9, wherein each one of said openings extends at least partially into a boss protruding over a portion of the external annular surface of the external platform sector, each one of said ducts extending at least partially into this boss, wherein the cylindrical wall sector is connected to each one of said bosses by material excess thicknesses into which said ducts extend at least partially, and wherein the casing comprises an annular lug surrounded by the annular row of orifices and comprising axial teeth engaged circumferentially between said material excess thicknesses.

* * * * *